Sept. 11, 1951  W. G. EWELL  2,567,664
CHICKEN CULLING DEVICE
Filed April 22, 1948  6 Sheets-Sheet 2

Inventor.
Willis G. Ewell.
By
Attys.

Sept. 11, 1951  W. G. EWELL  2,567,664
CHICKEN CULLING DEVICE
Filed April 22, 1948  6 Sheets-Sheet 3

Inventor.
Willis G. Ewell.
By
Atty's.

Sept. 11, 1951 W. G. EWELL 2,567,664
CHICKEN CULLING DEVICE
Filed April 22, 1948 6 Sheets-Sheet 4

Inventor.
Willis G. Ewell.
By

Sept. 11, 1951  W. G. EWELL  2,567,664
CHICKEN CULLING DEVICE
Filed April 22, 1948  6 Sheets-Sheet 5

Sept. 11, 1951 W. G. EWELL 2,567,664
CHICKEN CULLING DEVICE
Filed April 22, 1948 6 Sheets-Sheet 6

Fig. 9.

Inventor:
Willis G. Ewell.

Patented Sept. 11, 1951

2,567,664

UNITED STATES PATENT OFFICE 2,567,664

CHICKEN CULLING DEVICE

Willis G. Ewell, Chicago, Ill.

Application April 22, 1948, Serial No. 22,689

8 Claims. (Cl. 119—50)

This invention relates to the culling of poultry flocks, and its object, primarily, is to provide automatic means for separating the layers from the non-layers. Specifically, the invention pertains to improvements in sorting nests in combination with a series of horizontally disposed battery cages, wherein the layers are sorted out and confined temporarily in such manner as to establish the identity of each egg with the hen that laid it.

Another object is to provide a sorting nest having automatic mechanism operated by means of the hen's weight to reject the non-layers; to trap the layers; to "register" the eggs; to release the hens from the sorting nest; to reset itself to accommodate successive layers and non-layers and to confine the laying hens in individual temporary cages with feed and water available until such time as each hen is credited with her individual egg.

Another object is to provide a sorting nest with an entrance opening in one wall controlled by a rotatable door having an opening therein which is brought into register with the opening in the wall by the action of gravity on the door.

Another object is to provide a depressible floor in the sorting nest operatively connected to said door, whereby when the weight of a hen is applied to the floor the door will be rotated to its closed position, but will remain open if a non-laying hen enters the sorting nest and steps off the floor, the front door will open and the hen is free to leave the sorting nest through the registering openings in the front wall thereof and in the door.

Another object is to provide an exit opening in the back wall of the sorting nest normally closed by a rotatable door having an opening therein which is brought into register with the exit opening under the action of gravity when an egg has been laid, and an object of this invention is to provide a latch lever normally engaging the back door to prevent its rotation, but arranged to be tripped by a trip lever actuated by the weight of an egg thereon, whereby, as a result, the back door is released from the latch lever and permitted to gravitate to the position where the opening therein registers with the exit opening in the back wall, permitting the layer hen to leave the sorting nest through the exit opening.

Another object is to provide release means for the back door permitting it to be moved to its closed position, said release means being in the form of a bar or perch located at the exit opening, upon which bar or perch the hen treads in leaving the sorting nest, thereby actuating the latch lever and disengaging it from the back door, permitting the front door, because of its increased weight over the back door to gravitate to its open position and through suitable means to rotate the back door to its closed position where it will remain in closed position until again released by the weight of an egg on the trip lever.

Another object is to provide a battery of sorting cages having rotatable doors likewise operated by means of the hen's weight to shunt the hen from one cage to the next adjoining one in the series until the last unoccupied cage is reached. Similarly, successive layers are admitted to the sorting cages from the sorting nest and are shunted into the cages until the battery is completely occupied with hens aligned in the cages in the same numerical order in which they enter the sorting nest.

With these and other objects and advantages in view, this invention consists in the several novel features hereinafter fully set forth and more particularly defined in the appended claims.

The invention is clearly illustrated in the drawings accompanying this specification, in which.

This invention takes advantage of a simple application of a law of nature. It operates through the agency of gravity doors. The doors are all similar in pattern and they differ only in the matter of weight and in the manner of being mounted. A door is wheel-like in shape, revolves on a central hub, and is self-counterbalanced. The balance of a gravity door is designed into its pattern in such manner that the door is in a state of stable equilibrium when open, to permit entry or exit of a hen. When the door revolves on its central hub to its closed position, it assumes a state of unstable equilibrium, wherefore it is activated. Consequently, a closed door reacts to gravitate to its open position, unless otherwise restrained. In other words, a gravity door, due to its predetermined structure, is normally open. Whereas the weight of a hen within the nest closes the front door, when she leaves, the door gravitates to its normal, open position. Again, whereas a rear door is restrained in its closed position by means of an egg-operated latch, when the latch is disengaged, the rear door opens.

In a further application of this law of nature, a closed front door, in activated position, develops, in revolving to its open position, a gravitational force sufficient to impel the inert rear door to its closed position. Whereupon the sorting nest is re-set.

The application of this principle to the culling of a flock is simple. The minimum weight of a hen, applied at or near the center of the nest, closes the front door, the rear door remaining locked in its closed position. When the front door closes, it is activated. The weight of a non-laying hen, failing to complete the act of nesting, shifts out or away from the center of the nest to thereby lessen the restraint upon the closed front door, whereupon it reacts to gravitate to its open position. The non-layer is permitted to exit in the same direction from whence she made entry into the nest. Having failed to lay an egg, she is denied admittance to the battery. She stands rejected. The front door is open for another hen to make entry.

The weight of a laying hen, on the other hand, remains constantly in the center of the nest, due to her perseverance in nesting. Her weight, therefore, exerts a constant restraint upon the front door, whereupon, it remains closed. When the act of laying has been consummated, the egg trips out of the nest to disengage a latch lever holding the rear door in its closed position. The rear door, being closed, is in a position of activation. Therefore, when the latch is disengaged, the door reacts to gravitate to its open position. Hence, the layer is admitted into the battery cage and the door through which she made entry into the cage immediately closes behind her. The hen's weight on the grill floor of the cage lowers a cover over the feed container to deny her access thereto. The opposite door to the cage is in its open position, presenting, to the hen, the only means of escape. She has no choice, except to move into the next adjoining cage. Similarly, the hen is propelled from cage to cage until she is eventually confined within the last unoccupied cage, whereupon feed and water are made available. When the battery is completely occupied, the hens are confined in the order in which they first made entry into the nest, while their eggs are lined up in like order in the egg tray. Therefore each egg can be identified with the hen that laid it. When each hen has been credited with her individual egg, the door to the end cage is manually opened to release the hen occupying it. When she leaves the cage, she automatically releases the hen in the next preceding cage. In like manner, the battery is completely emptied and meanwhile the doors have all re-set themselves. Colored leg bands, or bands having embossed numerals, render the making of recordings an easy process, without catching, handling or frightening the hens.

The foregoing is merely intended to describe the manner in which this invention utilizes a single law of nature to cull the poultry flock. Subsequently, the mechanism employed in effecting this performance will be described in detail.

Referring now to said drawings which are merely illustrative of one embodiment of the invention, the reference character 15 designates the sorting nest and 16 designates a series of adjoining sorting cages which communicate with the sorting nest.

Figure 4:
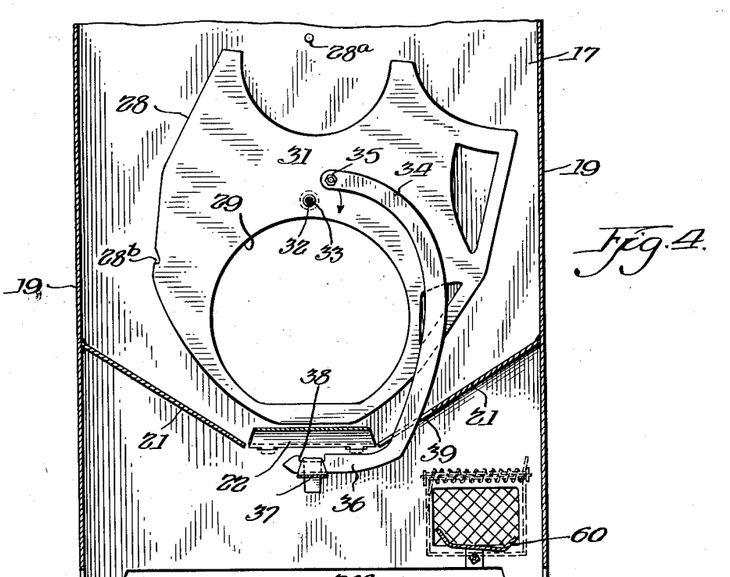
Fig. 4 is a vertical cross section through the sorting nest taken on the line 4—4 of Fig. 3 and showing the front door in open position.

The sorting nest may comprise a receptacle of rectangular form, as shown, having a front wall 17, a back wall 18, side walls 19, a top wall 20 and sloping bottom walls 21 which extend inward and downward from the side walls 19 with a space between their lower edges in which is located a depressible floor 22 preferably composed of two hinged together sections 23, 24 with one end fulcrumed upon the front wall 17 as by ears 25 that extend out through holes in the front wall and the other end fulcrumed as by ears 26 that extend down through holes formed in a bracket 27 secured to and extending down from the sloping bottom walls 21. The rear section 24 slopes toward the rear of the receptacle, and when the floor is depressed, the whole floor slopes toward the rear. The front wall 17 is formed with an entrance opening 30 through which the hens may enter and leave the sorting nest. A rotatably mounted door 28 is located within the sorting nest adjacent its front wall 17 and is formed with an opening 29, which when the door is in its open position as seen in Fig. 4, registers with the entrance opening 30 in the front wall 17. The door 28 has a solid portion 31 which closes the entrance opening whenever the door is moved to its closed position as seen in Fig. 5.

Figure 5:
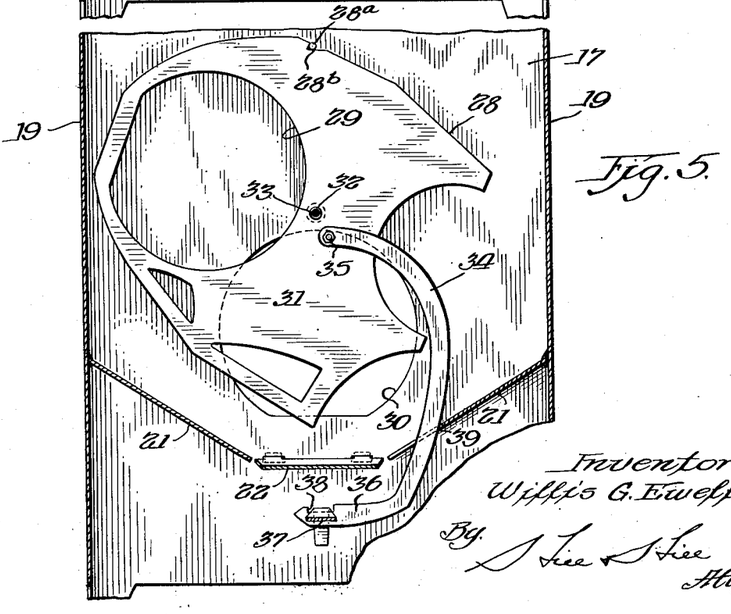
Fig. 5 is a view similar to Fig. 4, but showing the front door closed.

In the open position of the door as seen in Fig. 4, it is in a state of stable equilibrium; whereas, when moved into its closed position as seen in Fig. 5, it is in a state of unstable equilibrium. The door is formed with a hub 32, secured as by a pin upon a shaft 33 which is journaled in bearings in the front and rear walls 17 and 18 directly above the entrance and exit openings.

Figure 3:
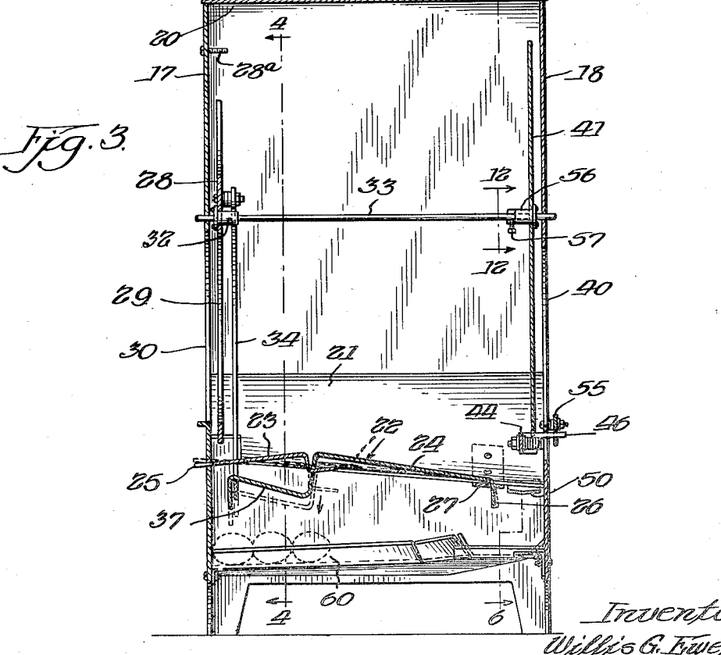
Fig. 3 is a vertical longitudinal section through the sorting nest taken on the line 3—3 of Fig. 2.

Operative mechanism actuated by the depressible floor is provided for swinging the door 28 into closed position upon the depression of the floor and, as shown, said means comprises a link 34 pivotally connected to the door at a point 35 adjacent its axis and extending in a curvilinear line around the inlet opening to a point below the floor 22 where it is formed with an approximately horizontal arm 36 which underlies the floor and is engaged by an arm 37 formed as a part of the section 24 of the floor (see Fig. 3). As shown, the arm 37 extends through a notch 38 formed in the horizontal arm 36 and engages said arm in a downward direction. A slot 39 is formed in one of the sloping bottom sections 21 to permit the passage of the link 34 therethrough.

Downward pull on the link 34 opens the door and a stop such as a pin 28a, cooperating with a notch 28b limits the rotatable movement of the door at its closed position (see Fig. 5).

Figure 2:
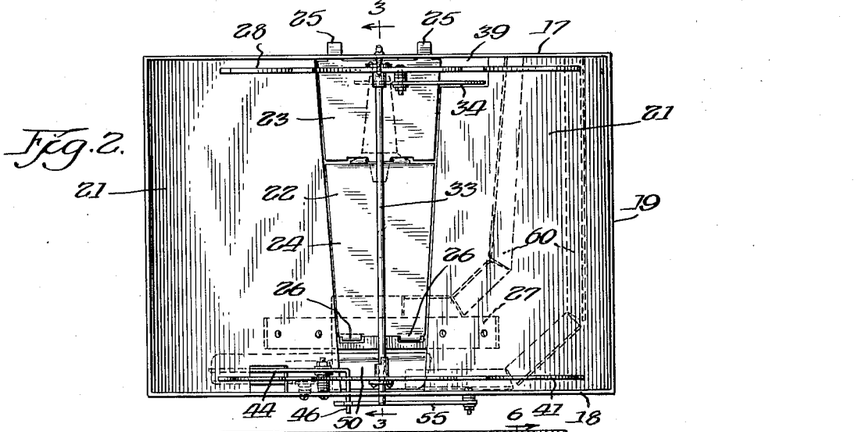
Fig. 2 is a plan of the sorting nest with the top wall removed to show the interior construction.
Figure 6:
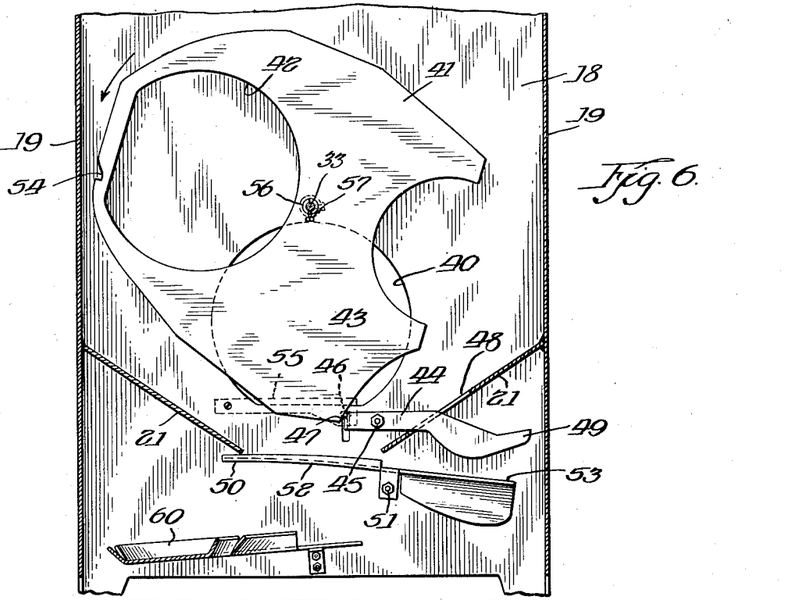
Fig. 6 is a vertical cross section through the sorting nest taken on the line 6—6 of Fig. 3 and showing the back door closed.

In the back wall 18 of the sorting nest is an exit opening 40 (see Fig. 6) which is controlled by a back door 41 that is rotatably mounted on the shaft 33 and capable of freely rotating relative thereto. The door 41 has an opening 42 therein which may be brought into register with the exit opening 40 and said door also has a solid portion 43 which is arranged to close the exit opening as seen in Fig. 6. Normally, the door 41 stands in the position seen in Fig. 6 closing the exit opening 40 and is held in such position by a latch lever 44 fulcrumed on the back wall 18 as at 45 and being formed with a transversely extending finger 46 (see Fig. 2), which normally engages with the edge of the back door as at 47 (see Fig. 6), whereby to hold the same in its closed position. Whenever the latch lever 44 is disengaged from the back door, the latter gravitates from the position seen in Fig. 6 to that seen in Fig. 7, thereby opening the exit opening 40. The latch lever extends through a slot 48 formed in one of the sloping bottom walls 21 where it is formed with an arm 49 which acts as a counter-weight for the other arm of the latch lever, thereby normally holding the finger 46 thereof in engagement with the back door 41.

Figure 7:
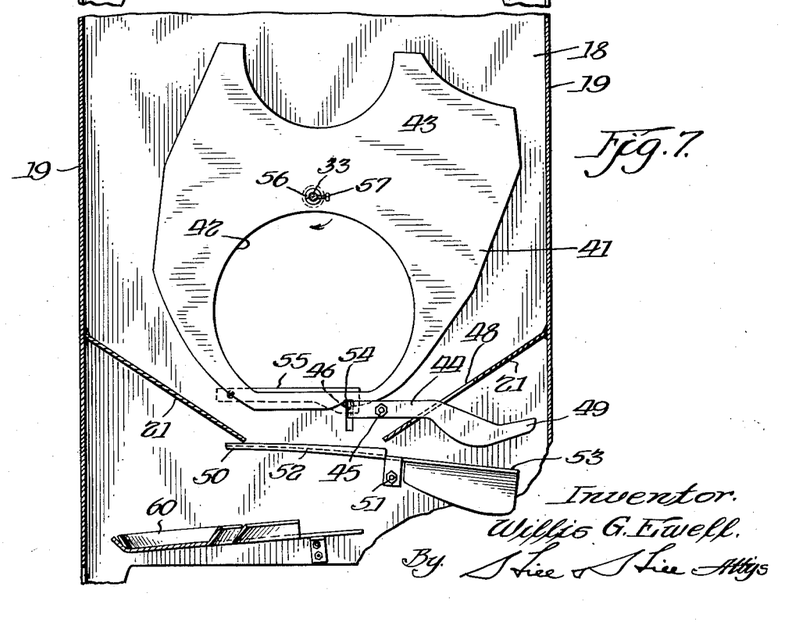
Fig. 7 is a view similar to Fig. 6, but showing the back door open.
Figures 8, 12:
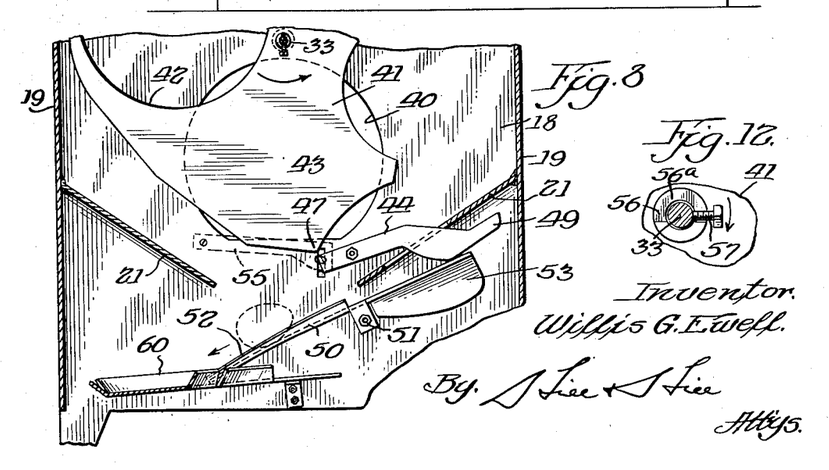
Fig. 8 is a view similar to Fig. 6, but showing the trip mechanism for the back door in tripping position.
Fig. 12 is a detail section taken on the line 12—12 of Fig. 3.

Means are provided for disengaging the latch lever from the back door when an egg has been laid in the nest and, as shown, said means comprises a trip lever 50 (see also Figs. 7 and 8) pivotally mounted upon the back wall 18 as at 51. The trip lever 50 is provided with an approximately horizontal, substantially flat portion 52 disposed between the rear end of the floor 22 and the back wall 18, in position for an egg to roll upon it. A counter-weight arm 53 extends from the fulcrum point of the trip lever to a position underneath the arm 49 of the latch lever 44 so that when the flat portion 52 of the trip member is swung downward as by the weight of an egg thereon (see Fig. 8), the arm 53 will be swung upward against the arm 49 of the latch lever, thereby swinging said latch lever upon its fulcrum from the position seen in Fig. 6 to that seen in Fig. 8, thereby depressing the finger 46 and disengaging it from the back door permitting the same to rotate under the influence of gravity from its closed position as seen in Figs. 6 and 8 to its open position as seen in Fig. 7. A notch 54 is formed in the edge of the back door, at a place where it will engage with the finger 46 when the back door reaches its open position as seen in Fig. 7 and is temporarily held in such position by reason of the engagement of the finger 46 in said notch.

Pivotally mounted on the rear side of the back wall 18 is a bar or perch 55, the upper edge of which is located slightly above the bottom edge of the exit opening so that a hen in leaving the nest will tread upon the bar or perch 55. The finger 46 of the latch lever extends through an opening in the bar or perch 55 so that when the bar or perch is depressed as by a hen treading thereon, the latch lever 44 is disengaged from the notch 54 permitting the back door to be closed.

A lost motion connection is provided between the shaft and back door, and as shown, the back door has a hub 56 formed with a timing notch 56a therein (see Fig. 12), through which extends a pin 57 that is secured in the shaft 33, which pin is adapted to engage an edge of the notch and thereby rotate the hub and therewith the back door when the shaft is being rotated in the opening movement of the front door.

While the back door is held in its open position by the latch lever 44, its hub 56, by reason of its engagement with the pin 57, prevents the shaft 33 from rotating and consequently prevents the front door from gravitating to its open position, but when the latch lever releases the back door, the front door gravitates to its open position (see Fig. 4), thereby rotating the shaft 33 in the direction of the arrow (see Fig. 12), causing the pin 57 to rotate the hub 56 by reason of its engagement with the edge of the notch thereby rotating the back door to its closed position where its edge 47 encounters the latch lever which stops it in closed position.

Below the trip lever 50 is an inclined egg tray 60 which may lead along one side wall of the receptacle to the front thereof. The eggs discharging from the trip lever roll down the tray in succession and may be removed through an opening in the wall of the receptacle. Each egg may be identified with the hen who laid it because the eggs follow each other in the same succession as the hens pass through the sorting cages.

Figure 9:
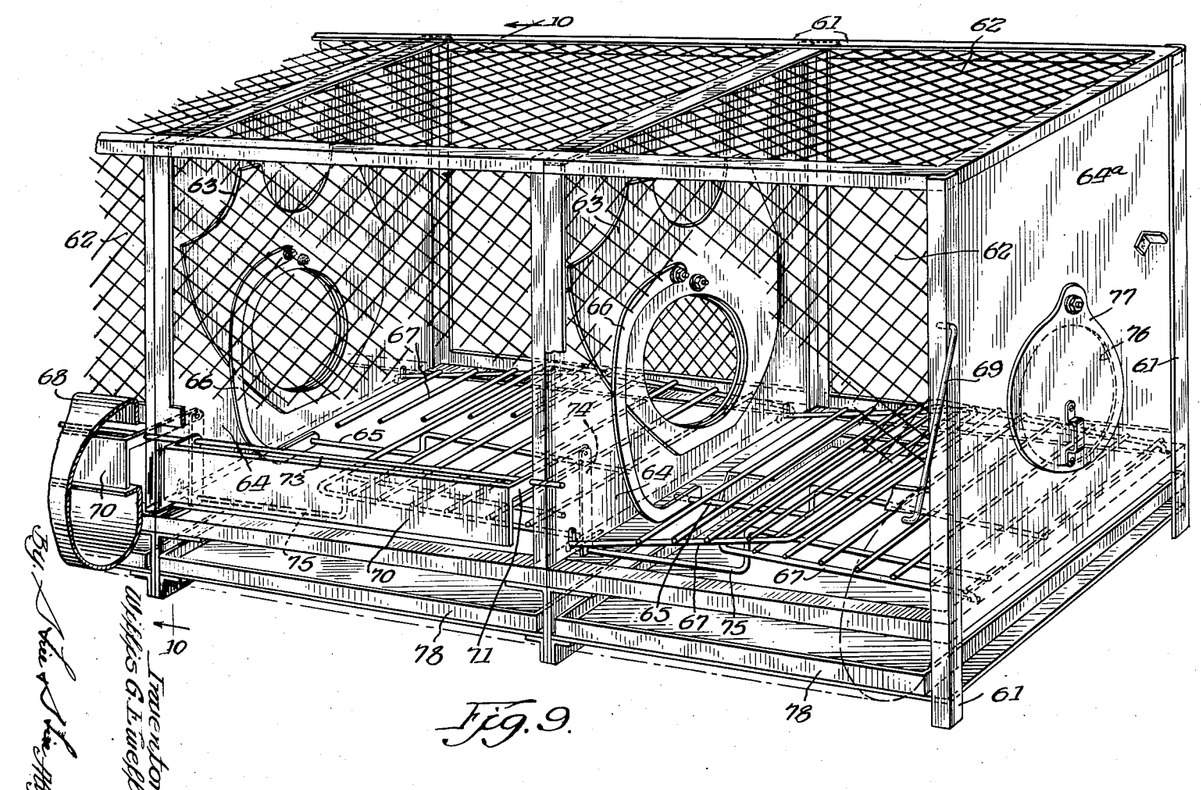
Fig. 9 is a perspective view of several of the sorting cages with certain portions of the walls and other parts broken out to more clearly illustrate parts within the cages.

Referring now to Fig. 9 which illustrates two sorting cage units and a fragment of a third unit, these units may be constructed of framework 61 and wire mesh side and top walls 62. Doors 63, substantially similar to the door 28 of the sorting nest are provided adjacent the end walls 64 of the units. Said walls and doors have openings that may register, as in the sorting nest, and the doors are connected to rods 65 by links 66 by which the doors are closed when the rods 65 are depressed. Grilled floors 67 each composed of two sections, as in the sorting nest, have their ends pivotally mounted in the end walls of the units and are disposed above the rods 65, so that when a hen enters a cage unit and steps upon the grilled floor, the latter is depressed and therewith the door controlling said cage unit is closed.

Figures 1, 11:
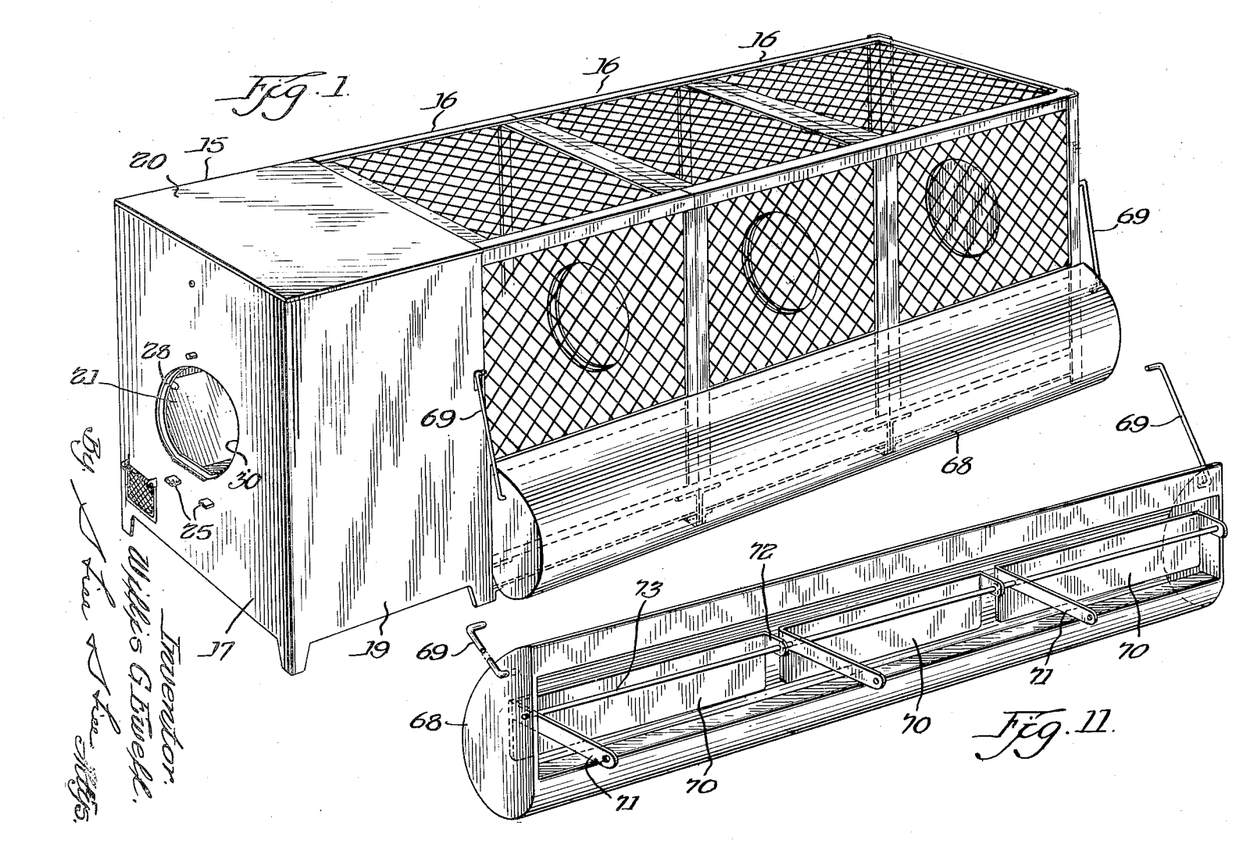
Fig. 1 is a perspective view of the sorting nest and several of the communicating cages.
Fig. 11 is a perspective view of a certain feed trough seen in Fig. 1, but looking at the opposite side thereof.

In one side wall of each cage unit is an open space which leads to the interior of a container 68 which is supported by links 69 that may be hooked into the walls of the sorting nest and the end cage as is seen in Fig. 1. The container contains food for the hens and each cage unit is provided with a cover 70, which in its raised position, permits access to the food in the container 68 as seen in solid lines in Fig. 10.

Figure 10:
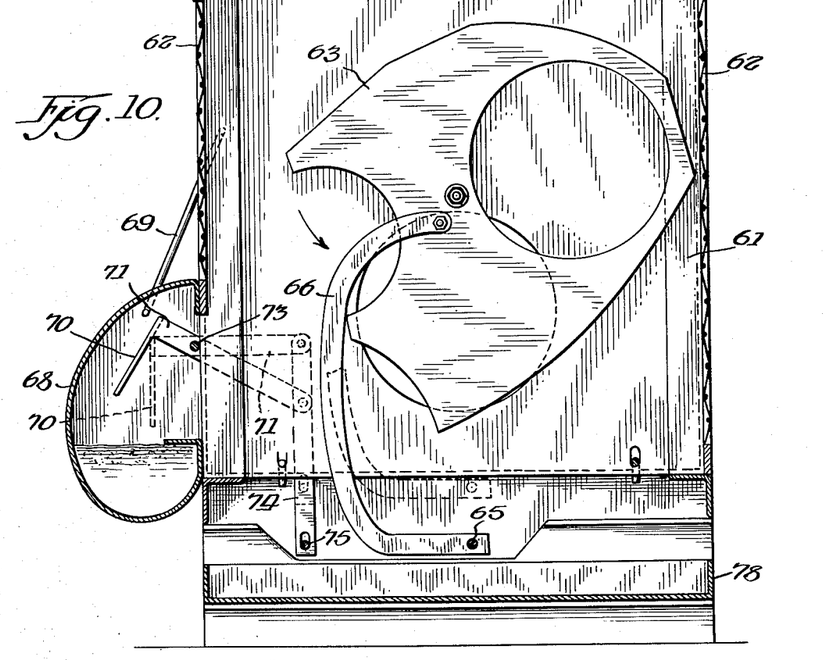
Fig. 10 is a vertical cross section through one of the cages taken substantially on the line 10—10 of Fig. 9.

The covers are provided with arms 71, 72 which are rotatably mounted upon a rod 73 secured at the end walls of the container and the long arms 71 are connected to links 74 by which the covers are manipulated. A rod 75 under the floor engages the lower end of the link 74 for the cover in the next adjacent rearward cage, and when a rod is depressed by the weight of a hen resting on the floor, the cover of said rearward next adjacent cage is raised, thereby providing access to the food.

In the end wall 64a of the last cage unit is an opening 76 closed by a manually operated swingable door 77. The hens are allowed to exit through the door opening 76 where the attendant may observe the identification mark carried by each hen.

Below the grill floors, pans 78 are removably supported by the frame structure of the grill units to catch drippings.

A fence or wall (not shown) may surround the top and sides of the sorting nest to prevent the non-layers from mingling with the layer hens that have passed through the sorting cages.

A rubber or other pliable hen's nest (not shown) may be placed on the bottom of the sorting nest if necessary.

In the operation of the device, when a hen enters the sorting nest through the front door 28, her weight is progressively applied as she moves toward the middle of the floor. The gradual application of her weight is due to the hinged arrangement of the floor sections 23, 24. When the hen first steps through the front door, her weight is partially supported by the wall at 25 where the floor is movably joined. As she moves toward the center of the floor her weight is gradually transferred. Therefore, the front door closes slowly, silently and without exciting or frightening the hen. With the hen's weight in the center of the floor, the floor sections move downward as shown by the dotted lines in Fig. 3. The movement of the floor is downward in contrast to a tilting motion, due to opposite ends of the floor being pivoted at the front and the back of the container. This action of the floor pulls down on the link 34 and revolves the front door from its position of stable equilibrium as shown in Fig. 4 to its closed position of unstable equilibrium as shown in Fig. 5. When the front door closes by the weight of the hen, the rear door remains locked in its closed position as shown in Fig. 6. The front door is rigidly fixed to the forward end of the shaft and when the front door revolves, the shaft turns with it, thereby moving freely within the hub of the rear door, said door remaining locked.

A non-laying hen in moving about within the nest causes her weight to be withdrawn from the center of the floor, thereby releasing the resrtaint on the front door, wherefore it reacts to gravitate to its open position to release her. When the front door opens, the rear door remains locked by the latch lever 44 and due to the shaft turning freely in the hub of the rear door.

A laying hen continues to nest and her weight remains constantly in the central position on the floor. When the act of laying has been consummated, the egg rolls out of the back of the nest, contacts the trip-lever 50 tilting it downward as shown in Fig. 8. The lever arm 53 moves upward to contact the arm 49 of the latch lever 44 to trip its opposite arm out of engagement with the periphery of the door, wherefore the rear door reacts to gravitate to its open position as shown in Fig. 7. When the rear door revolves to its extreme open position, the latch 44 re-engages it at the notch 54 to lock the rear door in its open position.

The locking of the rear door in open position reacts to lock the front door in closed position. When locked open, the hub of the rear door by means of the timing notch 56a in its hub, is in rigid contact with the set pin 57 rigidly set in the rear end of the shaft 33. Since the shaft is rigidly attached to the front door hub and being restrained from turning by means of the rigid engagement of the pin with the hub of the locked rear door, the front door is therefore locked closed. The hen has no choice except to exit by way of the rear door after laying an egg. When the hen leaves the nest she steps on the bar or perch 55 to disengage the latch lever 44 from the notch 54 to unlock the rear door from its open position. When the hen's body clears the door opening the restraint on the front door is released by means of the rear door unlocking. Whereupon, the front door reacts to open, and being heavier in weight than the rear door, and being activated through being in closed position while the rear door is inert, the opening of the front door closes the back door, whereupon the latch lever 44 re-engages the rear door as at 47 to lock it closed. Whereupon the nest is reset.

When the first hen has laid her egg, she is released through the rear door to be admitted into the initial cage unit. A door 63 exactly similar in shape, in pattern and in weight to the front door of the sorting nest, is rotatably mounted above the entrance opening to the first cage 16 of the series, said opening being adjacent the exit opening of the sorting nest. The wire grill floor 67 is operatively connected to the door. When the hen's weight is applied to the grill floor, the door 63 closes behind her. The cover 70 for the feed container 68 is lowered to deny the hen access thereto. Being otherwise trapped, the hen moves through the open door into the next succeeding cage 16. The door 63 closes behind her. The cover 70 in lowered position denies her access to feed. The door of the next cage is open to present a means of escape, so the hen moves on until eventually she is confined in the final cage 16 where feed and water are available. Succeeding hens likewise are shunted into individual cage units. Their eggs likewise line up in rotation in the egg tray as shown in Fig. 3.

A battery may be composed of several horizontal rows of cages, or they may be banked one above the other. Further, a battery may consist of banks of sorting nests that shunt the layers through a dividing partition. A multi-unit culling house may be provided having several dividing partitions whereupon recordings may be made perhaps once during the week. This method is especially adapted to the culling of the farm flock where there may be no particular need for identifying the egg with the hen that laid it. Farm culling usually means simply sorting out the hens that lay lots of eggs from those that don't.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A chicken culling device comprising in combination, a sorting nest having front and back walls, an entrance opening in said front wall and an exit opening in said back wall, a shaft rotatably mounted in said front and back walls above said openings, a counter-balanced front door having a hub rigidly mounted on the front end of said shaft, a counter-balanced back door having a hub rotatably mounted on the rear end of said shaft, said doors each having an opening therein that coincides with an opening in a wall of the sorting nest when the doors stand in a state of equilibrium, said doors each having an imperforate portion that obstructs an opening when the doors are in a state of unstable equilibrium, a pivotally mounted depressible floor, a link in operative relation to the floor and operatively connected to the front door whereby downward movement of the floor and link rotates the front door to its closed position, and when downward pressure on the floor is relieved the front door gravitates to its open position, and latch means to normally hold the back door closed.

2. A chicken culling device comprising in combination, a sorting nest having front and back walls, an entrance opening in said front wall and an exit opening in said back wall, a shaft rotatably mounted in said front and back walls above said openings, a counter-balanced front door having a hub rigidly mounted on the front end of said shaft, a counter-balanced back door having a hub rotatably mounted on the rear end of said shaft, said doors each having an opening therein that coincides with an opening in a wall of the sorting nest when the doors stand in a state of equilibrium, said doors each having an imperforate portion that obstructs an opening when the doors are in a state of unstable equilibrium, a pivotally mounted depressible floor, a link having an arm underlying the floor and operatively connected to the front door whereby downward movement of the floor and link rotates the front door to its closed position, and when downward pressure on the floor is relieved the front door gravitates to its open position, and egg operated latch means to normally hold the back door closed.

3. A chicken culling device comprising in combination, a sorting nest having front and back walls, an entrance opening in the front wall and an exit opening in the back wall, a shaft rotatably mounted in said front and back walls above said openings, a counter-balanced front door having a hub rigidly mounted on the front end of the shaft, a counter-balanced back door of lighter weight than the front door having a hub rotatably mounted on the rear end of the shaft, said doors each having an opening therein that coincides with an opening in the sorting nest when the doors stand in a state of equilibrium, said doors each having an imperforate portion that obstructs an opening when the doors are in a state of unstable equilibrium, a pivotally mounted depressible floor, a link in operative relation to the floor and operatively connected to the door whereby downward movement of the floor and link rotates the front door to its closed position, and when downward pressure on the floor is relieved the front door gravitates to its open position, a latch lever engaging and holding the back door in its closed position and also holding it in its open position, an egg actuated trip lever engageable with an arm of the latch lever when tripped by an egg rolling upon it, and a perch with its upper edge disposed above the lower edge of the back opening and operatively connected with said latch lever whereby to disengage it from the back door when the perch is depressed, and means operatively connecting said shaft and back door whereby the front door may rotate the back door to its closed position following depression of said perch.

4. A chicken culling device comprising in combination, a sorting nest having front and back walls, an entrance opening in the front wall and an exit opening in the back wall, a shaft rotatably mounted in said front and back walls above said openings, a counter-balanced front door having a hub rigidly mounted on the front end of the shaft, a counter-balanced back door of lighter weight than the front door and having a hub rotatably mounted on the rear end of the shaft, a lost motion connection between said shaft and hub of the back door, said doors each having an opening therein that coincides with an opening in the sorting nest when the doors stand in a state of equilibrium, said doors each having an imperforate portion that obstructs an opening when the doors are in a state of unstable equilibrium, a pivotally mounted depressible floor, a link having an arm underlying the floor and operatively connected to the door whereby downward movement of the floor and link rotates the front door to its closed position, and when downward pressure on the floor is relieved the front door gravitates to its open position, a latch lever engaging and holding the back door in its closed position and also holding it in its open position, an egg actuated trip lever engageable with an arm of the latch lever when tripped by an egg rolling upon it, and a perch with its upper edge disposed above the lower edge of the back opening and operatively connected with said latch lever whereby to disengage it from the back door when the perch is depressed, whereby the front door may gravitate to its open position and rotate the back door to its closed position.

5. A chicken culling device comprising in combination, a sorting nest having front and back walls, an entrance opening in the front wall and an exit opening in the back wall, a shaft rotatably mounted in said front and back walls above said openings, a counter-balanced front door rigidly mounted on the front end of said shaft, a counter-balanced back door of less weight than the front door and having a hub rotatably mounted on the rear end of said shaft, a pin secured in said shaft and having a lost motion connection with said hub, whereby the back door may rotate to open position relative to the front door when the latter is closed, said lost motion connection providing means whereby the front door may gravitate to its open position and therewith rotate the back door to its closed position.

6. A chicken culling device comprising in combination, a sorting nest having front and back walls, an entrance opening in the front wall and an exit opeing in the back wall, a shaft rotatably mounted in said front and back walls above said openings, a counter-balanced front door rigidly mounted on the front end of said shaft, a counter-balanced back door of less weight than the front door and having a hub rotatably mounted on the rear end of said shaft, a pin secured in said shaft and having a lost motion connection with said hub, whereby the back door may rotate to open position relative to the front door when the latter is closed, egg operated latch mechanism for locking the back door in closed position and in open position, and a perch at the exit opening operatively connected to said latch mechanism, and adapted when depressed to unlatch the back door in its open position, said lost motion connection providing means whereby the front door may gravitate to its open position and therewith rotate the back door to its closed position.

7. A chicken culling device comprising in combination, a sorting nest having front and back walls, an entrance opening in said front wall and an exit opening in said back wall, a shaft rotatably mounted in said front and back walls above said openings, a counter-balanced front door having a hub rigidly mounted on the front end of said shaft, a counter-balanced back door having a hub rotatably mounted on the rear end of said shaft, said doors each being movable to uncover their respective openings when the doors respectively stand in a state of equilibrium, said doors each obstructing their respective same openings when the doors respectively are in a state of unstable equilibrium, a downwardly depressible member mounted within said nest, means operatively connecting said front door and said member, whereby downward movement of the member will rotate the front door to its closed position, and when downward pressure on the member is relieved, the front door gravitates to its open position, and egg operated latch means operatively associated with said back door to normally hold the back door closed.

8. In a chicken sorting nest, the combination of a receptacle having an entrance opening in one wall, of an exit opening in another wall thereof, an entrance door structure, a portion of which is movable into a position to operatively cover the entrance opening, or into a position to uncover the same, said door structure being constructed to permit movement under the action of gravity of such portion thereof into an open position, an exit door structure, a portion of which is movable into position to operatively cover the exit opening, or to a position to uncover the same, said exit door structure being constructed to permit movement under the action of gravity of such portion thereof into an open position, said door structure being so constructed that the gravitational forces acting on said entrance door structure are greater than the corresponding forces acting on the exit door structure, latch means for maintaining said exit door structure in either open or closed position, means operatively connecting both door structures for limiting relative movement therebetween, said means being operable to prevent movement of said entrance door structure when the exit door structure is maintained in an open position, and to transmit opening movement of said entrance door structure to the exit door structure when the latter is in an open position to close the same in opposition to gravitational forces therein, a downwardly depressible member, means operatively connecting said member and said entrance door structure, whereby the latter is moved to a closed position when said member is depressed, egg actuatable means operative to disengage said latch means from the closed exit door structure and permit the latter to gravitate to an open position, and means for subsequently disengaging said latch means from the open exit door structure, whereby the latter is moved into a closed position by gravitational movement of the entrance door structure into open position.

WILLIS G. EWELL.

REFERENCES CITED

The following references are of record in the file of this patent:

UNITED STATES PATENTS

| Number | Name | Date |
|---|---|---|
| 830,301 | Clark | Sept. 4, 1906 |
| 914,720 | Harper | Mar. 9, 1909 |
| 1,217,721 | Drake | Feb. 27, 1917 |
| 1,417,631 | Roberts | May 30, 1922 |
| 1,535,512 | Waggonner | Apr. 28, 1925 |
| 1,565,476 | Little et al. | Dec. 15, 1925 |
| 1,616,661 | Keyse | Feb. 8, 1927 |
| 1,696,394 | Garankin | Dec. 25, 1928 |
| 1,824,557 | Loehr | Sept. 22, 1931 |
| 2,055,110 | Raymond | Sept. 22, 1936 |
| 2,108,287 | Kellum | Feb. 15, 1938 |

FOREIGN PATENTS

| Number | Country | Date |
|---|---|---|
| 26,129 | Denmark | June 3, 1920 |
| 643,997 | France | Sept. 29, 1928 |